Jan. 25, 1938.  B. DICK  2,106,592

LIQUID PRESSURE MECHANISM

Filed July 24, 1930

Inventor
BURNS DICK
By E. E. Huffman
Att'y.

Patented Jan. 25, 1938

2,106,592

UNITED STATES PATENT OFFICE 2,106,592

LIQUID PRESSURE MECHANISM

Burns Dick, Ferguson, Mo., assignor to Wagner Electric Corporation, St. Louis, Mo., a corporation of Delaware Application July 24, 1930, Serial No. 470,392

3 Claims. (Cl. 60—54.6)

My invention relates to liquid pressure producing mechanism particularly suitable for use as the compressor or "master cylinder" apparatus of hydraulic braking systems, its object being to avoid loss of any operating liquid which may leak past the piston and to maintain a body of liquid at the rear of the piston. By my invention all possibility of air being drawn past the piston into the pressure system is avoided and liquid in any quantity necessary to replace the liquid lost during pressure application is available to pass the piston into the system during the return movement of the piston.

Figure 1:
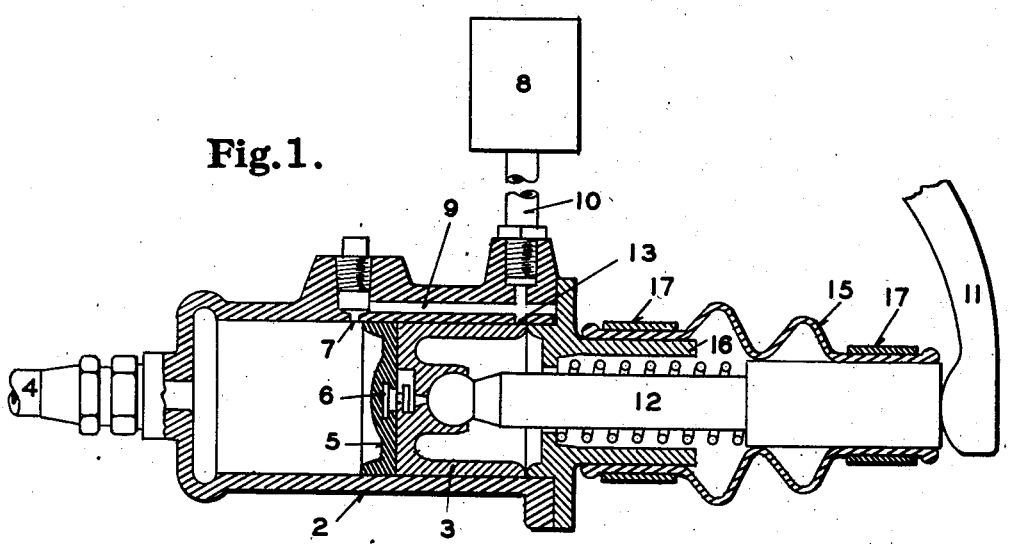
Figure 2:
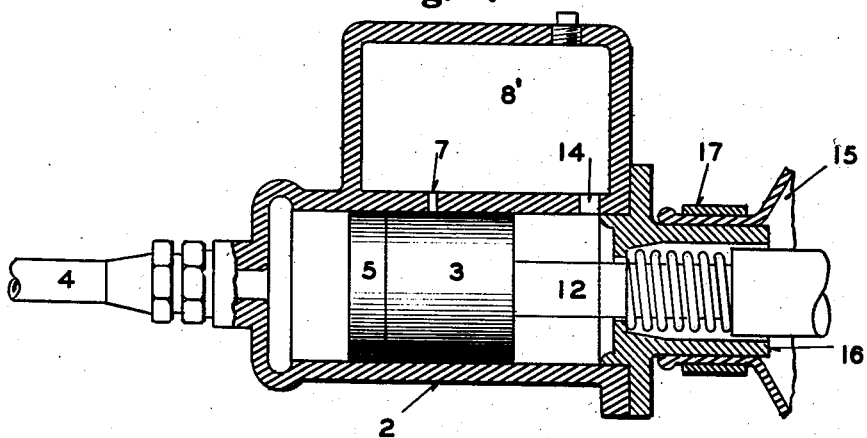

In the accompanying drawing Figure 1 is a cross sectional view illustrating an embodiment of my invention, and Figure 2 is a fragmentary view corresponding to a portion of Figure 1 but showing the piston in an advanced position and also illustrating a modification in which the reservoir for the operating liquid is associated with the master cylinder instead of being spaced therefrom as shown in Figure 1.

Referring to Figure 1, 2 represents the cylinder and 3 the piston operating therein to force liquid into the pressure line 4 of, for example, a hydraulic braking apparatus for vehicles. The piston is sealed by cup 5 of flexible material, which cup may be caused to follow the piston on its return movement by being secured thereto by means of the flanged pin 6 which, according to known practice, is so connected to the piston as to permit the cup to freely adjust itself in the cylinder. The wall of the cylinder is provided with a compensating opening 7 located just in advance of the sealing cup when the piston is in retracted position, which oppening directly communicates with the liquid reservoir 8', when this reservoir is associated with the cylinder as in Figure 2; or through passage 9 and conduit 10 when the reservoir 8 is positioned at some point removed from the cylinder, as illustrated in Figure 1. 11 indicates a foot-operated lever which, through the rod 12, actuates the piston in brake applying direction.

The function of a compensating opening, such as 7, connected with the liquid supply reservoir, is to permit flow of liquid out of and into the brake system under the influence of temperature changes and thus avoid development of any pressure in the brake system when not desired and the development of any sub-atmospheric pressure which would tend to cause air to be drawn into the pressure system. And, in order to avoid the drawing in of air past the piston during its return stroke under the condition that during the pressure stroke some liquid leaked from a fluid motor at the brake mechanism, it has been the practice to maintain a body of fluid at the rear of the piston, or in an annular chamber around the piston intermediate its ends, in order that during the return stroke of the piston, liquid rather than air passes from the rear of the sealing cup and between the cup and the walls of the cylinder. The first mentioned method for maintaining a body of liquid at the rear of the sealing cup has required that the operating lever, such as 11, be in the liquid reservoir, as illustrated, for example, in Loughead Patent No. 1,758,671. The second mentioned method has required the use of a packing at the rear end of the piston. And it is also customary to use in such constructions a flexible dust excluding "boot" embracing the piston operating rod and secured to the cylinder.

My invention constitutes an improvement over the prior devices described above, in that by means of the passage 13, illustrated in Figure 1, which communicates with the passage 9 extending to the liquid supply conduit 10, or by means of the passage 14, in the form illustrated in Figure 2, I cause the space at the rear of the piston to always be filled with liquid and to form a liquid-tight chamber for this purpose I employ a tube 15 of flexible material, such as rubberized fabric, which embraces the rear end of the rod 12 and a tubular extension 16 of the cylinder, being held in liquid-tight relation with these parts by means of the clamps 17. The rod 12 is thus permitted to have the desirable slight pivotal motion during the movement of the piston and no packing or other form of seal offering a tendency to leak, is required either on the piston rod or on the rear end of the piston. If, during the forward stroke of the piston, the elongation of the cylinder portion of the liquid containing space at the rear of the piston is not compensated for by the reduction in volume of the space enclosed by the tube or boot 15, liquid will enter from the reservoir through the passages 13 and 14, and likewise if any reduction of the liquid containing space at the rear of the piston and within the boot occurs during the return movement of the piston, liquid may pass from this space through said passages to the reservoir. And if, upon return movement of the piston, any sub-atmospheric pressure is developed in the pressure system, liquid rather than air must pass the periphery of the cup 5 since there is no possibility of air entering the chamber at the rear of the piston, my arrangement being as effective in this respect as the more expensive construction in which an operating lever, such as 11, must extend into the liquid reservoir.

Having fully described my invention, what I claim as new and desire to secure by Letters Patent of the United States is:

1. In a hydraulic brake system, a master cylinder, a piston reciprocable therein, a plunger for actuating the piston, a swivel connection between the plunger and the piston, a flexible boot attached at one end to the plunger and enclosing the rear side of the piston, said boot being adapted to contain a fluid, and means for positively moving the plunger and piston in one direction to produce a fluid pressure in the cylinder, said means movable in the opposite direction independently of the retractile movement of the plunger and piston.

2. In a hydraulic braking system, a cylinder provided with an outlet at one end and an opening at the other end, a piston reciprocable therein, a plunger for actuating the piston and extending through the opening of the cylinder, a connection between the plunger and piston, a member secured to the end of the cylinder provided with the opening and having an annular flange extending in the axial direction of and surrounding the plunger, a flexible fluid containing boot having a cylindrical portion at one end secured to the outer surface of the annular flange of the member, means for securing the other end of the boot to the exterior portion of the plunger, and means for actuating the plunger.

3. In a hydraulic braking system, a cylinder provided with an outlet at one end and an opening at the other end, a piston reciprocable therein, a plunger for actuating the piston and extending through the opening of the cylinder and provided with a shoulder, a connection between the plunger and piston, a member secured to the end of the cylinder provided with the opening, a flexible fluid containing boot secured to the member, means for securing the other end of the boot to the exterior portion of the plunger, a coil spring interposed between the member and the shoulder on the plunger for moving the piston to its retracted position, and means for positively moving the plunger and piston in one direction to produce a fluid pressure in the cylinder, said means being movable in the opposite direction independently of the retractile movement of the plunger and piston.

BURNS DICK.